(12) United States Patent
Chernoguzov et al.

(10) Patent No.: US 7,127,528 B2
(45) Date of Patent: Oct. 24, 2006

(54) CACHING PROCESS DATA OF A SLOW NETWORK IN A FAST NETWORK ENVIRONMENT

(75) Inventors: Alexander Chernoguzov, Warrington, PA (US); William R. Hodson, Telford, PA (US)

(73) Assignee: Honeywell International Inc., Morristown, NJ (US)

( * ) Notice: Subject to any disclaimer, the term of this patent is extended or adjusted under 35 U.S.C. 154(b) by 757 days.

(21) Appl. No.: 10/201,183

(22) Filed: Jul. 22, 2002

(65) Prior Publication Data

US 2004/0015558 A1    Jan. 22, 2004

(51) Int. Cl.
*G06F 15/16* (2006.01)

(52) U.S. Cl. ............... 709/249; 709/223; 709/224; 709/228

(58) Field of Classification Search ........... 709/223, 709/224, 232–235, 238, 249, 227, 228
See application file for complete search history.

(56) References Cited

U.S. PATENT DOCUMENTS

| | | | |
|---|---|---|---|
| 4,035,778 A | 7/1977 | Ghanem ............... 364/200 |
| 4,503,501 A | 3/1985 | Coulson et al. ........ 364/300 |
| 5,043,885 A | 8/1991 | Robinson .............. 364/200 |
| 5,381,539 A | 1/1995 | Yanai et al. ........... 395/425 |
| 5,617,577 A * | 4/1997 | Barker et al. .......... 712/12 |
| 5,778,430 A | 7/1998 | Ish et al. ............... 711/133 |
| 5,787,471 A | 7/1998 | Inoue et al. ........... 711/133 |
| 5,873,100 A | 2/1999 | Adams et al. ......... 707/204 |
| 5,883,640 A | 3/1999 | Hsieh et al. ........... 345/503 |
| 5,890,213 A | 3/1999 | Sokolov ............... 711/113 |
| 5,945,619 A * | 8/1999 | Tamura ................ 84/604 |
| 5,963,540 A * | 10/1999 | Bhaskaran ............ 370/218 |
| 5,983,318 A | 11/1999 | Willson et al. ........ 711/113 |
| 6,128,701 A | 10/2000 | Malcolm et al. ...... 711/133 |
| 6,131,147 A | 10/2000 | Takagi ................. 711/159 |
| 6,163,773 A | 12/2000 | Kishi .................. 706/16 |
| 6,189,078 B1 * | 2/2001 | Bauman et al. ....... 711/156 |
| 6,209,062 B1 | 3/2001 | Boland et al. ........ 711/134 |
| 6,282,616 B1 | 8/2001 | Yoshida et al. ....... 711/133 |
| 6,396,845 B1 * | 5/2002 | Sugita ................. 370/449 |
| 6,523,132 B1 * | 2/2003 | Harari et al. .......... 714/8 |
| 2002/0083197 A1 * | 6/2002 | Jung et al. ............ 709/238 |
| 2003/0026268 A1 * | 2/2003 | Navas ................. 370/400 |
| 2003/0035386 A1 * | 2/2003 | Sullivan ............... 370/316 |
| 2004/0080988 A1 * | 4/2004 | Harari et al. .......... 365/200 |

* cited by examiner

*Primary Examiner*—Saleh Najjar
*Assistant Examiner*—Liang-che Alex Wang

(57) ABSTRACT

A caching method and system for a control system having a fast network and a slow network that each contain devices involved in the control of a process is disclosed. The cache is disposed in a gateway interface device interconnected with both the fast and the slow networks. The cache is populated only in response to requests of clients connected in the fast network but is refreshed independently of the fast network. To reduce traffic on the slow network, the cache is populated with a collection of parameters to which a requested parameter belongs. This avoids a round trip on the slow network for future requests of the requested parameter and other members of the collection. A parameter is removed from cache if an associated expiration timer expires before a further request therefor is received. Cache refresh is variable based on loading of the slow network and responsiveness of the devices of the slow network.

38 Claims, 3 Drawing Sheets

CACHING PROCESS DATA OF A SLOW NETWORK IN A FAST NETWORK ENVIRONMENT

FIELD OF THE INVENTION

This invention relates to a system and method for communication with devices in a slow network that is connected in a fast network environment. More particularly, the invention relates to a system and method that facilitates such communication with a cache.

BACKGROUND OF THE INVENTION

A process is often controlled by a control system that includes a fast (e.g., 10 MB or faster) native network and a slow (e.g., 31 KB) non-native network. In such a system, there is a need for communication between the devices of the fast native network and the devices of the slow non-native network. For example, a part of the process may require that an intelligent valve in the slow non-native network be actuated based on a temperature monitored by a temperature sensor in the fast native network. A control processor in the fast native network controls this part of the process by gathering the temperature data, processing the data according to a control program and communicating a control signal for the valve of the slow non-native network.

Typically, data of the non-native devices is accessed by two or more clients (e.g., a host computer or the control processors) in the fast native network. These clients may have to wait for their accesses to be serviced due to the slow speed of the slow non-native network. This can result in long delays that hinder processing in the fast network and affect the control of the process.

There is a need for a simple and flexible communication system that reduces the delays caused by the speed difference between fast and slow networks that control a process.

SUMMARY OF THE INVENTION

The method of the present invention accesses data of a slow network interconnected with a fast network. The data comprises parameters of a plurality of devices that monitor or control a process. In particular, the method provides a cache in a gateway interface device disposed between the fast network and the slow network. The cache is populated with the parameters of devices of the slow network based on requests from clients of the fast network. The populated parameters of each of the devices are refreshed independently of one another.

Preferably, the refresh rate is variable based on the responsiveness of each of the devices, the loading of the slow network, and the number of parameters in cache for a given device. Thus, slower devices are queried less often than faster devices. For example, a refresh of the slower device is skipped if a previous refresh thereof is unfinished. The refresh rate is self-throttling based on a load of the slow network, the self-throttling being independent of loading on the fast network.

Preferably, a populated or cached parameter remains in the cache until a time expires without a further request therefor from the clients. The time is reset if, before it expires, a further request for the parameter is received.

If a requested parameter is a member of a collection of parameters, the entire collection is placed in the cache. This avoids the round trip delay of accessing the slow network for future requests of that parameter or other members of the collection. The collection may be selected from the group consisting of: view, record and array. The collection selection may also be based on a priority of largest to smallest, e.g., view, record and array.

Preferably, a cache manager is disposed in the gateway interface device to manage the populating and refreshing of the cache.

The system of the invention comprises a gateway interface device disposed between the fast network and the slow network. The gateway interface device includes a cache and a cache manager for populating and refreshing the cache with parameters of devices connected in the slow network based on requests of clients connected in the fast network. The various preferences and embodiments of the method of the present invention are provided by the cache manager.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
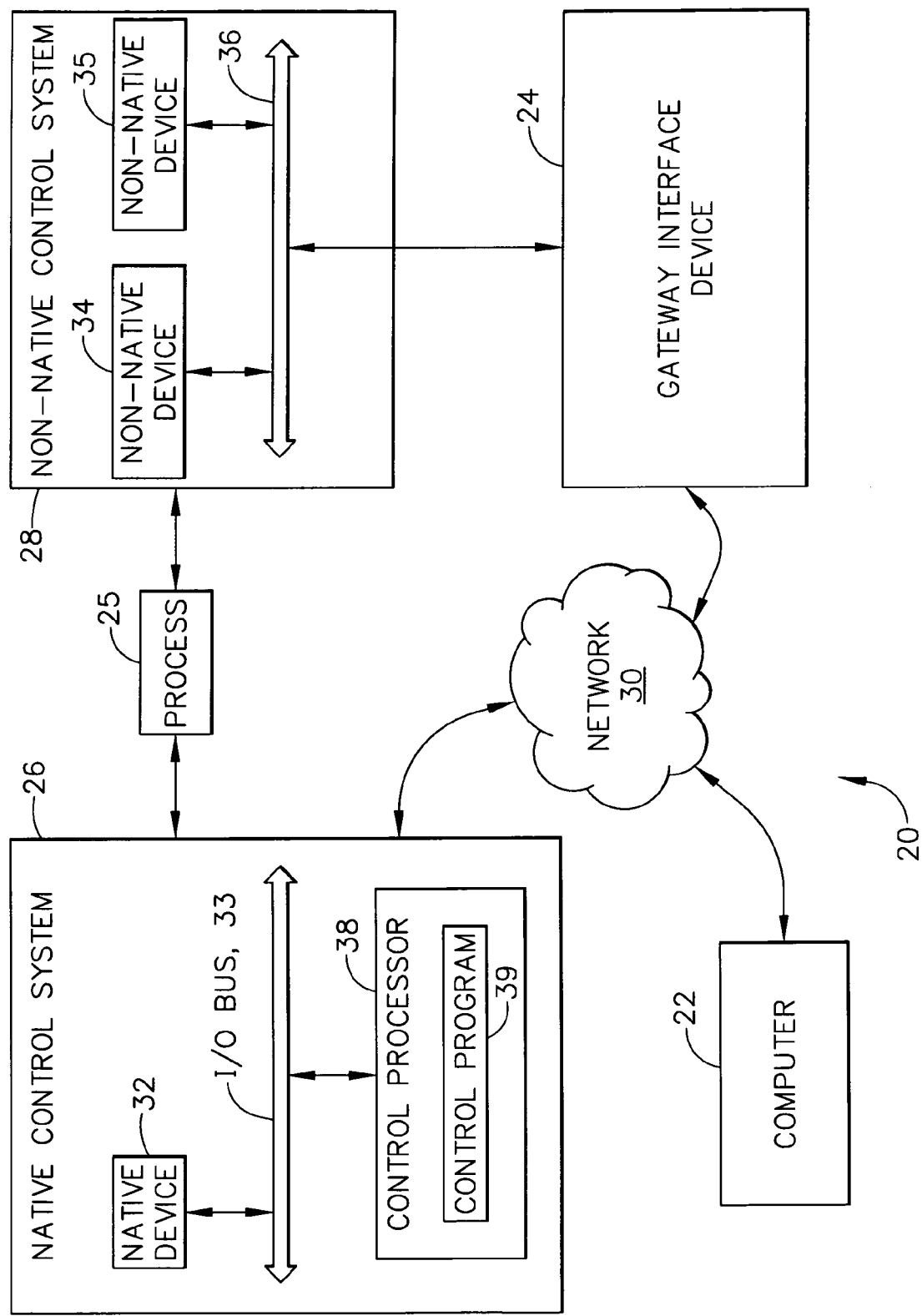
FIG. 1 is a block diagram of a control system in which the control interface system and method of the present invention can be used.

Referring to FIG. 1, a control system 20 includes a computer 22, a gateway interface device 24, a native control system 26, a non-native control system 28 and a network 30. Computer 22 is interconnected with native control system 26 and gateway interface device 24 via network 30. Gateway interface device 24 is also directly interconnected with non-native control system 28. Network 30 typically operates at a fast speed, e.g., 10 MB or faster, while non-native control system 28 operates at a much slower speed, e.g., 31 KB.

Native control system 26 includes one or more native devices 32 (shown as one, by way of example) that monitor and/or control a process 25. Native control system 26 also includes a control processor 38 that is interconnected with native device 32 via an input/output (I/O) BUS 33. Control processor 38 is also interconnected with computer 22 and gateway interface device 24 via network 30. Control processor 38 includes a control program 39.

Non-native control system 28 includes one or more non-native devices 34 and 36 (shown as two, by way of example) that monitor and/or control the same process as monitored and controlled by native control system 26. Non-native devices 34 and 36 are interconnected via a non-native BUS 35.

Computer 22 may be a single computer or a plurality of computers interconnected via network 30. Network 30 may be any suitable wired or wireless communication network and may include the Internet, an Intranet, the public telephone system or the like. Preferably, network 30 is an open standard network, such as Ethernet.

Native devices 32 and non-native devices 34 and 36 may be any suitable devices that monitor or control process 25, such as temperature sensors, flow rate sensors, valves, pumps, electrical switches, or the like.

Control processor 38 may be any control processor that has a processor, a memory, an I/O unit for communications via I/O BUS 33 with native devices 32 and a communications unit (not shown) for communication via network 30. For example, if network 30 is the Internet, control processor 38 has a browser capability for Internet communications. Similarly, computer 22 and gateway interface device 24 would be equipped with Internet capability to serve files and/or otherwise communicate via the Internet.

Gateway interface device 24 is interconnected with fast network 30 as well as with the slower operating non-native control system 28 (slow network). Gateway interface device 24 is operable to access non-native data developed by non-native devices 34 and 36 in response to requests made by clients interconnected with network 30. These clients may include one or more computers 22 and/or one or more control processors 38.

Figure 2:
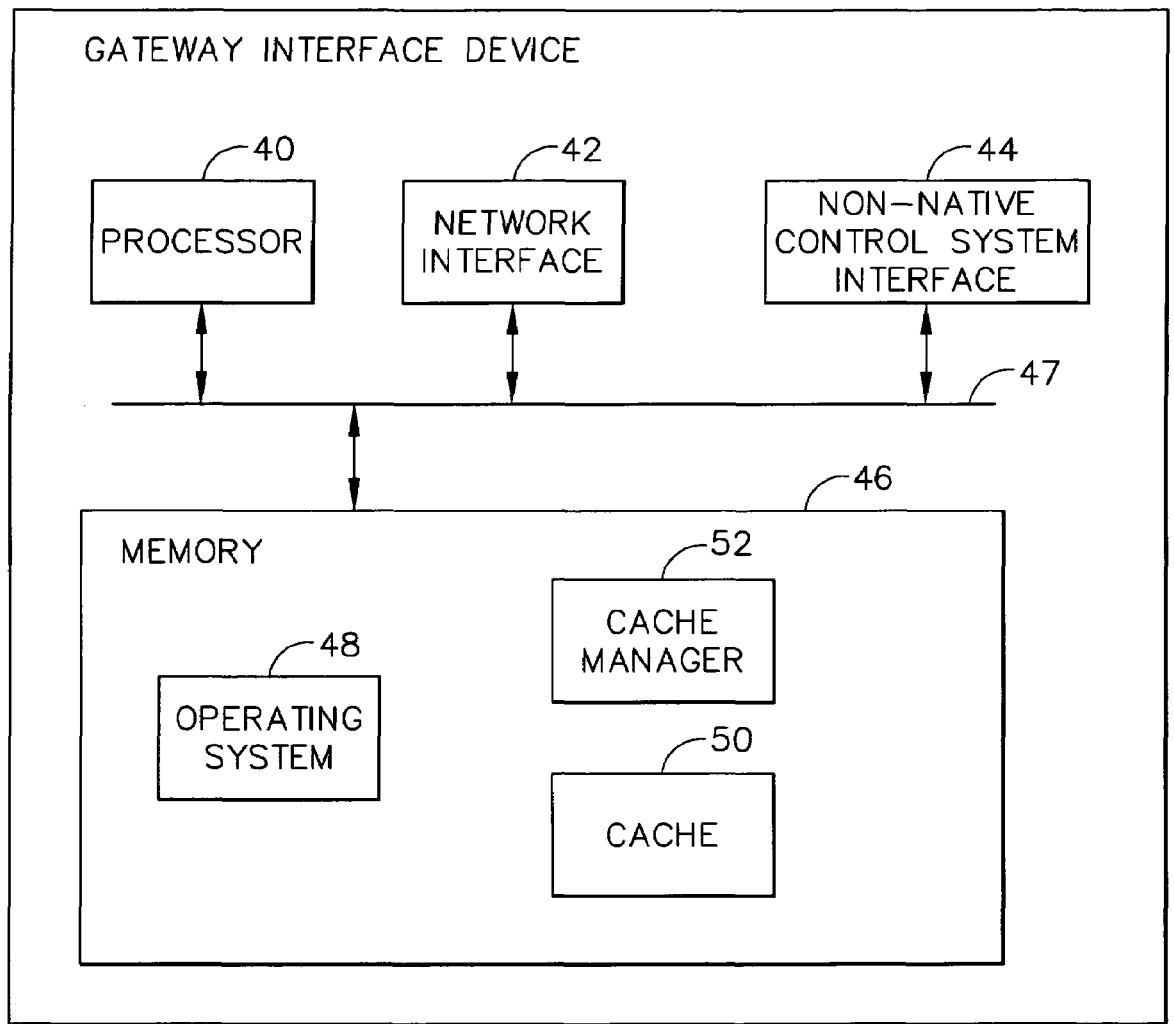
FIG. 2 is a block diagram of the gateway interface device of the FIG. 1 control system.

Referring to FIG. 2, gateway interface device 24 includes a processor 40, a network interface 42, a non-native control system interface 44, a memory 46 and a BUS 47. BUS 47 interconnects processor 40, network interface 42, non-native control system interface 44 and memory 46. Memory 46 includes an operating system 48, a cache 50 and a cache manager 52. Operating system 48 controls processor 40 to execute cache manager program 52.

Cache manager program 52, when run, causes operating system 48 to operate processor 40 to control and manage the accessing of non-native data from non-native control system 28 (shown in FIG. 1). Cache manager program 52 responds to requests made by clients connected in fast network 30 for accessing the non-native data. Once accessed, a particular non-native data is placed in cache 50, where it can be rapidly accessed in response to future requests, thereby avoiding a round trip delay over the slow network for future requests for the data. Since the data is already in cache 50, there is no need to access non-native device 34 or 36, thereby considerably reducing traffic on slow network BUS 35.

Cache manager program 52 manages cache 50 by populating cache 50 with the parameters of non-native devices 34 and 36 based on requests from the clients of fast network 30. For example, if an operator station requests a parameter, which is not already in cache 50, from non-native device 34, that parameter is at that time added to cache 50. The parameter stays in cache 50 as long as any operator station or any control processor is requesting it. If the parameter is not requested for a predetermined time, the parameter is removed from cache 50. That is, each parameter in cache 50 has an expiration timer. When a request for a cached parameter is received, its expiration timer is reset. If the expiration timer expires before a further request therefor is received, the parameter is removed from cache.

Since only parameters requested by clients are cached, traffic on slow network BUS 35 is minimized. Slow non-native control system 28 can typically have hundreds of parameters. Out of this large number of parameters, only a few are required to be always visible to plant operators. Caching only a few parameters versus hundreds of parameters results in less traffic on non-native BUS 35 and, therefore, better network utilization.

Figure 3:
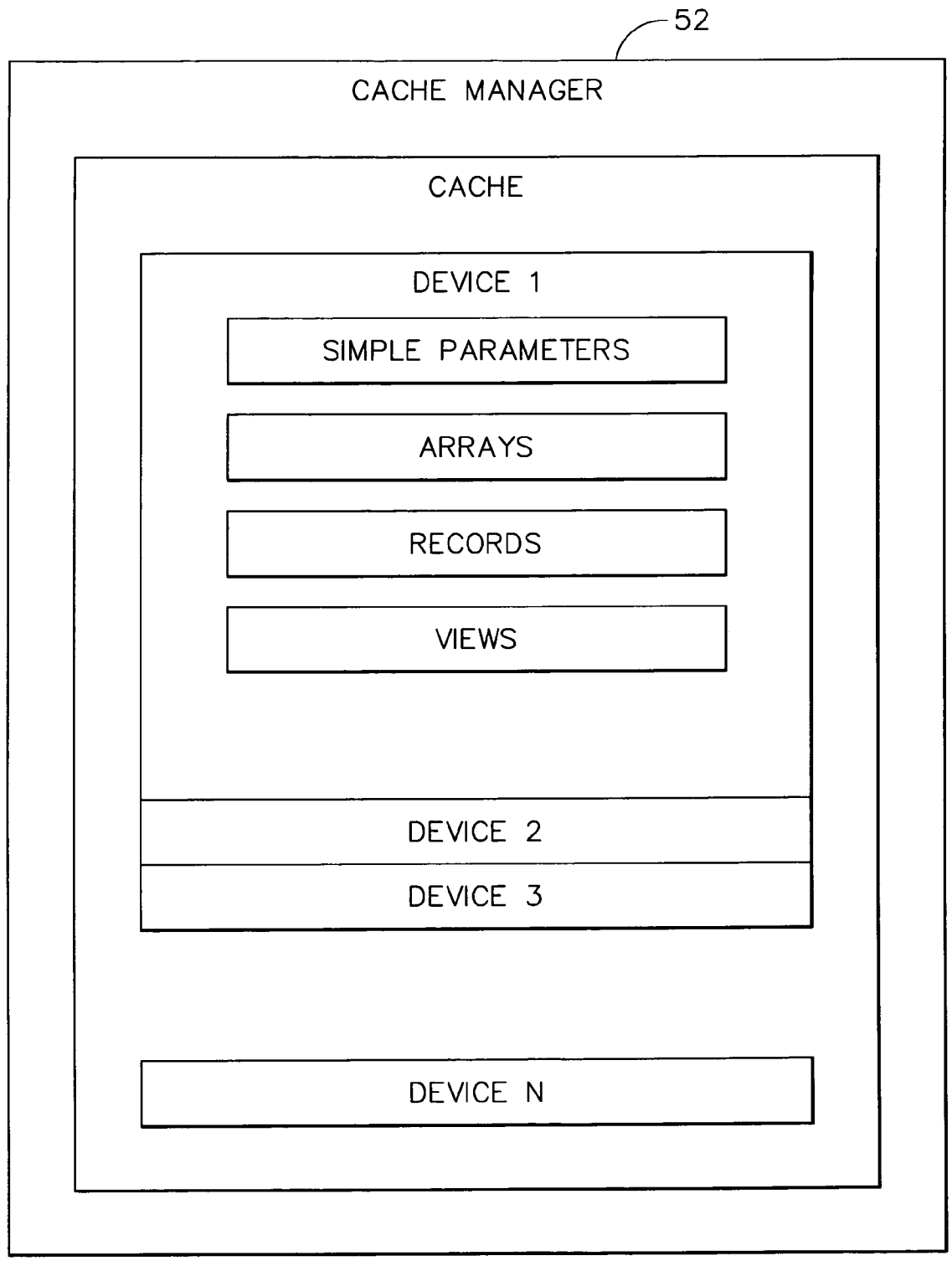
FIG. 3 depicts a structure of the cache manager of the gateway interface device of FIG. 2.

Referring to FIG. 3, cache manager program 52 manages the parameters on a device basis. That is, the parameters of non-native devices 34 and 36 are managed separately from one another. This is indicated in FIG. 3 by the separate boxes for non-native devices labeled device 1 through device N. For example, device 1 and device 2 correspond to non-native devices 34 and 36, respectively. Device 3 up to device N correspond to other non-native devices (not shown) that are connected in non-native control system 28.

Cache manager program 52 optimizes traffic on slow network BUS 35 by minimizing the number of communication transactions needed to refresh cache 50. This is accomplished by accessing the largest object (collection of parameters) containing the requested parameter value. Non-native control system 28 has several parameter collection constructs that can be accessed as a single item. These collection constructs include:

1. View—a collection of generally unrelated parameters including records and arrays grouped together for data access optimization purposes.
2. Record—a group of parameters under a common heading each with its own name; and
3. Array—multiple parameter values with the same name differentiated by an index;

Cache manager program 52 uses the following procedure to determine what to read from non-native device 34 or 36 in order to satisfy a client request for a given parameter:

1. If the requested parameter value can be accessed as part of a view, the entire view is read into cache 50. Subsequent requests for other parameters that are part of the same view are satisfied from cache 50 without a need to access non-native device 34 or 36.
2. If the requested parameter value is part of a record, the entire record is brought into cache 50. Subsequent requests for other members of the record are satisfied from cache 50 without a need to access non-native device 34 or 36.
3. If the requested parameter value is part of an array, the entire array is brought into cache 50. Subsequent requests for other elements of that array are satisfied from cache 50 without a need to access non-native device 34 or 36.

Cache manager program 52 prioritizes the collections by selecting the largest collection. For the collections listed above, the priority order is view, record and array.

Cache manager program 52 refreshes the parameters that populate cache 50 independently of one another and independently of the client request rate from fast network 30. At the beginning of a cache refresh period, cache manager program 52 starts separate refresh cycles for each non-native device that has a cached or populated parameter value in cache 50. In each refresh cycle, cache manager program 52 causes the reading of fresh parameter values of that device into cache 50. At the beginning of the next refresh period, new refresh cycles are started for each device for which the previous refresh cycle was completed. An uncompleted refresh cycle is continued until completion. After all the cached parameter values for a given device are refreshed, another refresh cycle is started for that device.

The refresh rate of cache 50 is variable. It is based on the load of slow network BUS 35, the responsiveness of a given non-native device 34 or 36, and the number of parameters in cache 50 for a given non-native device 34 or 36. For example, cache 50 may contain 10 parameters for device 1 and two parameters for device 2. For this example, the refresh rate of device 2 will be faster than that of device 1. As a further example, if device 1 and device 2 have the same number of parameters in cache 50, but device 1 is faster than device 2, the refresh rate device 1 will be faster than that of device 2.

The overall cache refresh rate may also vary based on the load of slow network BUS 35. When slow network BUS 35 is loaded more, the cache refresh rate drops. As the slow network load subsides, the cache refresh rate increases. This operation is self-throttling. For example, a high network load may be due to one of non-native devices 34 or 36 having a slow response or having a large number of cached parameters. Thus, the refresh rate for the non-native device causing the high load drops or self throttles.

The present invention having been thus described with particular reference to the preferred forms thereof, it will be obvious that various changes and modifications may be made therein without departing from the spirit and scope of the present invention as defined in the appended claims.

What is claimed is:

1. A method for accessing data of a slow network interconnected with a fast network, wherein said data comprises parameters of a plurality of devices that monitor or control a process, said method comprising:
   (a) providing a cache and a cache manager in a gateway interface device disposed between said fast network and said slow network, wherein said devices are connected in said slow network to monitor or control said process; and
   (b) operating said cache manager to populate said cache with said parameters based on requests received via said fast network from clients of said fast network and to refresh the populated parameters of each of said devices independently of one another;
   wherein said fast network comprises a native network that comprises at least one native device that also monitors or controls said process, wherein said slow network comprises a non-native network in which said non-native devices are connected, and wherein a condition monitored by said native device is communicated to said gateway interface device for control of at least one of said non-native devices.

2. The method of claim 1, wherein said populated parameters are refreshed with a variable refresh rate.

3. The method of claim 2, wherein said variable refresh rate is based on the responsiveness of each of said devices.

4. The method of claim 3, wherein slower ones of said devices are queried less often than faster ones.

5. The method of claim 3, wherein a refresh of one of said devices is skipped if a previous refresh thereof is unfinished.

6. The method of claim 2, wherein said variable refresh rate is self-throttling.

7. The method of claim 6, wherein said refresh rate self throttles based on a load of said slow network.

8. The method of claim 6, wherein said self-throttling is independent of loading on said fast network.

9. The method of claim 6, wherein a refresh of one of said devices is skipped if a previous refresh thereof is unfinished.

10. The method of claim 1, wherein a populated parameter remains in said cache until a time expires without a further request therefor from said clients.

11. The method of claim 10, wherein said time is reset after said further request.

12. The method of claim 1, wherein a first one of said parameters is a member of a collection of said parameters, and wherein step (b) responds to a request for said first parameter to populate said cache with said collection of parameters.

13. The method of claim 12, wherein said collection of said parameters is selected from the group consisting of: view, record and array.

14. The method of claim 12, wherein subsequent requests for said members of said collection are satisfied from said cache without accessing said slow network.

15. The method of claim 13, wherein said collection is selected based on a priority order of view, record and array.

16. The method of claim 2, wherein a first one of said parameters is a member of a collection of said parameters, and wherein step (b) responds to a request for said first parameter to populate said cache with said collection of parameters.

17. The method of claim 16, wherein said collection is selected from the group consisting of: view, record and array.

18. The method of claim 16, wherein subsequent requests for members of said collection are satisfied from said cache without accessing said slow network.

19. The method of claim 17, wherein said collection is selected based on a priority order of view, record and array.

20. A system for accessing data of a slow network interconnected with a fast network, wherein said data comprises parameters of a plurality of devices that monitor or control a process, said system comprising:
   a gateway interface device disposed between said fast network and said slow network, wherein said gateway interface device comprises a cache and a cache manager, wherein said devices are connected in said slow network to monitor or control a process, and wherein said cache manager populates said cache with said parameters based on requests received via said fast network from clients of said fast network and refreshes the populated parameters of each of said devices independently of one another,
   wherein said fast network comprises a native network that comprises at least one native device that also monitors or controls said process, wherein said slow network comprises a non-native network in which said non-native devices are connected, and wherein a condition monitored by said native device is communicated to said gateway interface device for control of at least one of said non-native devices.

21. The system of claim 1, wherein said populated parameters are refreshed with a variable refresh rate.

22. The system of claim 21, wherein said variable refresh rate is based on the responsiveness of each of said devices.

23. The system of claim 22, wherein slower ones of said devices are queried less often than faster ones.

24. The system of claim 22, wherein a refresh of one of said devices is skipped if a previous refresh thereof is unfinished.

25. The system of claim 21, wherein said variable refresh rate is self-throttling.

26. The system of claim 25, wherein said refresh rate self throttles based on a load of said slow network.

27. The system of claim 25, wherein said self-throttling is independent of loading on said fast network.

28. The system of claim 25, wherein a refresh of one of said devices is skipped if a previous refresh thereof is unfinished.

29. The system of claim 20, wherein a populated parameter remains in said cache until a time expires without a further request therefor from said clients.

30. The system of claim 29, wherein said time is reset after said further request.

31. The system of claim 20, wherein a first one of said parameters is a member of a collection of said parameters, and wherein said means for populating responds to a request for said first parameter to populate said cache with said collection of parameters.

32. The system of claim 31, wherein said collection of said parameters is selected from the group consisting of: view, record and array.

33. The system of claim 31, wherein subsequent requests for members of said collection are satisfied from said cache without accessing said slow network.

34. The system of claim 32, wherein said collection is selected based on a priority order of view, record and array.

35. The system of claim 21, wherein a first one of said parameters is a member of a collection of said parameters, and wherein said gateway interface device responds to a request for said first parameter to populate said cache with said collection of parameters.

36. The system of claim 35, wherein said collection is selected from the group consisting of: view, record and array.

37. The system of claim 35, wherein subsequent requests for members of said collection are satisfied from said cache without accessing said slow network.

38. The system of claim 36, wherein said collection is selected based on a priority order of view, record and array.

* * * * *